Patented Nov. 22, 1932

1,888,334

UNITED STATES PATENT OFFICE

OSCAR TEXTOR, OF SHAKER HEIGHTS, AND BERT O. CRITES, OF CLEVELAND, OHIO

COMPOSITION FOR CLEANING

No Drawing. Application filed December 15, 1928. Serial No. 326,403.

This invention relates to cleaning compounds; and it is among the objects of the invention to provide a composition capable of being handled in a pulverulent or granular form and affording a desired concentration of an effective agent without requiring disadvantageous delay for solution. Other objects and advantages will appear as the description proceeds.

To the accomplishment of the foregoing and related ends, the invention, then, consists of the features hereinafter fully described, and particularly pointed out in the claims, the following description setting forth in detail but one of the various ways in which the principle of the invention may be employed.

In accordance with our invention, sulphuric acid and finely divided solid material not detrimentally affected by the acid are made up capable of being handled and packaged in solid form. Naturally occurring mineral materials, as diatomaceous earth, volcanic ash, fuller's earth, and such like are particularly desirable. The acid may be admixed with diatomaceous earth in proportions up to the point where the liquid saturates the granular mass, but generally the proportions may range from 5 or 8 to 75 per cent. of sulphuric acid. We may also further add to the acid and earth mixture a soluble sulphate, as sodium sulphate ($Na_2SO_4$). This may be added in a range of proportions in accordance with particular conditions contemplated. In general, an acid concentration of 8-15 per cent. is desirable, and usually about 9 per cent. Thus by adding about 88 per cent. of sodium sulphate to about 12 per cent. of a 3 to 1 sulphuric acid-diatomaceous earth mixture, a generally advantageous composition is had.

The acid employed need not be chemically pure, but the commercial grade, usually of about 66° Bé., is quite suitable. Similarly, the sodium sulphate need not be of chemically pure form, the so-called salt cake commercially available being quite satisfactory for the purpose.

Such a composition may be employed in a varied range of detergent usages, and is notably efficient for cleaning and removing stains from stone and stone-like surfaces, marble, porcelain, enamel, etc.

It will thus be seen that a composition presenting an effective and generally desirable agent may be had in a form obviating the inherent limitations of the liquid physical condition, and making possible the handling on the basis of a solid, and with the incorporation of a soluble mineral material, not only is the action furthered, but insoluble residue is correspondingly minimized, and altogether it becomes possible to attain the marked utilities of a highly absorbent mineral material with at the same time an unobjectionable amount of residue, the effective action being additionally furthered.

Other modes of applying the principle of the invention may be employed, change being made as regards the details disclosed, provided the ingredients stated in any of the following claims, or the equivalents of such, be employed.

We therefore particularly point out and distinctly claim as our invention:—

1. A cleaning composition, which comprises about 9 per cent. of sulphuric acid, about 3 per cent of diatomaceous earth, and about 88 per cent. of sodium sulphate.

2. A finely divided solid cleaning composition, which comprises 8-15 per cent of sulphuric acid absorbed in an inert divided solid mineral absorbent, and an alkali-metal sulphate, the alkali-metal sulphate very largely predominating over the divided solid mineral.

Signed by us this 14th day of December, 1928.

OSCAR TEXTOR.
BERT O. CRITES.